US012559387B2

(12) United States Patent
　　 Cao et al.

(10) Patent No.: US 12,559,387 B2
(45) Date of Patent: Feb. 24, 2026

(54) TERNARY POSITIVE ELECTRODE MATERIAL AND METHOD FOR PREPARING SAME, POSITIVE ELECTRODE SHEET AND LITHIUM ION BATTERY

(71) Applicants: REPT BATTERO Energy Co., Ltd., Zhejiang (CN); Shanghai Ruipu Energy Co., Ltd., Shanghai (CN)

(72) Inventors: Hui Cao, Wenzhou (CN); Yi Yao, Shanghai (CN); Min Hou, Shanghai (CN); Chan Liu, Shanghai (CN); Yaqing Yang, Shanghai (CN); Yingying Guo, Shanghai (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 568 days.

(21) Appl. No.: 18/093,694

(22) Filed: Jan. 5, 2023

(65) Prior Publication Data

US 2023/0234858 A1　　Jul. 27, 2023

(30) Foreign Application Priority Data

Jan. 26, 2022　(CN) .......................... 202210089034.7

(51) Int. Cl.
*C01G 53/50*　　(2025.01)
*H01M 10/0525*　　(2010.01)

(52) U.S. Cl.
CPC ........ *C01G 53/50* (2013.01); *H01M 10/0525* (2013.01); *C01P 2002/85* (2013.01); *C01P 2004/64* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 9,614,225 B2 | 4/2017 | Park | |
| 2018/0019464 A1 | 1/2018 | Xia et al. | |
| 2018/0261842 A1 | 9/2018 | Park et al. | |
| 2021/0005874 A1 | 1/2021 | Park et al. | |
| 2021/0234155 A1 | 7/2021 | Jeong et al. | |
| 2022/0069300 A1 | 3/2022 | Tochio et al. | |
| 2022/0085378 A1 | 3/2022 | Du et al. | |
| 2022/0411284 A1 | 12/2022 | Seo et al. | |
| 2023/0348294 A1 | 11/2023 | Heo et al. | |

FOREIGN PATENT DOCUMENTS

| | | | | |
|---|---|---|---|---|
| CN | 103594692 A | 2/2014 | | |
| CN | 104300135 A | 1/2015 | | |
| CN | 105118967 A | 12/2015 | | |
| CN | 108258224 A | 7/2018 | | |
| CN | 108630923 A | 10/2018 | | |
| CN | 109167051 A | 1/2019 | | |
| CN | 111592052 A | 8/2020 | | |
| CN | 111668475 A | 9/2020 | | |
| CN | 111902976 A | 11/2020 | | |
| CN | 112005411 A | 11/2020 | | |
| CN | 112103496 A | * 12/2020 | ........ | H01M 10/0525 |
| CN | 112151775 A | 12/2020 | | |
| CN | 113366670 A | 9/2021 | | |
| CN | 113851607 A | 12/2021 | | |
| CN | 114122385 A | 3/2022 | | |
| JP | 2015069958 A | 4/2015 | | |
| JP | 2018510450 A | 4/2018 | | |
| JP | 2021516434 A | 7/2021 | | |
| JP | 2023542196 A | 10/2023 | | |
| WO | 2017095153 A1 | 6/2017 | | |
| WO | 2019120973 A1 | 6/2019 | | |
| WO | 2021132761 A1 | 7/2021 | | |
| WO | 2021153546 A1 | 8/2021 | | |
| WO | 2022103105 A1 | 5/2022 | | |

OTHER PUBLICATIONS

Chen et al., CN 112103496 A, English Translation from FIT (Year: 2020).*
The State Intellectual Property Office of People's Republic of China, First Office Action and Search Report, Application No. 202210089034.7, Mar. 16, 2022, 11 pages.
The State Intellectual Property Office of People's Republic of China, Supplementary Search, Application No. 202210089034.7, Apr. 2, 2022, 1 page.
European Patent Office, Extended European Search Report, Application No. 22275159.6, Jul. 12, 2023, 6 pages.
PCT International Search Report and Written Opinion, PCT/CN2022/134960, Feb. 20, 2023, 18 pages.
Japanese Patent Office, Notice of Reasons for Refusal and Search Report, Application No. 2022-200283, Apr. 1, 2024, 55 pages.

* cited by examiner

*Primary Examiner* — Colin W. Slifka
(74) *Attorney, Agent, or Firm* — Quarles & Brady LLP

(57) ABSTRACT

A ternary positive electrode material, a method for preparing the same, a positive electrode sheet and a lithium ion battery in which the ternary positive electrode material has a chemical composition of $Li_a(Ni_xCo_yM_{1-x-y})_{1-b}M'_bO_{2-c}A_c$, wherein $0.75 \leq a \leq 1.2$, $0.5 \leq x < 1$, $0 < y \leq 0.1$, $0 \leq b \leq 0.01$, $0 \leq c \leq 0.2$; M is at least one selected from the group consisting of Mn and Al; M' is at least one selected from the group consisting of Al, Zr, Ti, Y, Sr, W and Mg; A is at least one selected from the group consisting of S, F and N; and $2\% \leq C_{Co1} - C_{Co}$, $5\% \leq C_{Al} - C_{Al1}$. The lithium ion battery shows better short-term kinetic performances and long-term kinetic performances, and it also exhibits excellent stability in long-term cycles.

19 Claims, No Drawings

TERNARY POSITIVE ELECTRODE MATERIAL AND METHOD FOR PREPARING SAME, POSITIVE ELECTRODE SHEET AND LITHIUM ION BATTERY

CROSS-REFERENCE TO RELATED APPLICATIONS

This application claims priority to Chinese Patent Application No. 202210089034.7 filed Jan. 26, 2022, the disclosure of which is incorporated herein by reference in its entirety and for all purposes.

TECHNICAL FIELD

The present disclosure relates to the technical field of lithium ion batteries, particularly a ternary positive electrode material having an $\alpha$-$NaFeO_2$ structure, a method for preparing the same, a positive electrode sheet and a lithium ion battery.

BACKGROUND ART

Lithium-nickel-cobalt-manganese and lithium-nickel-cobalt-aluminum ternary positive electrode materials having an $\alpha$-$NaFeO_2$ structure have become one of the mainstream positive electrode materials for lithium ion power batteries due to their high specific capacity and excellent kinetic performances such as low DCR and high rate charge/discharge capacity retention.

The three main transition metal elements in the ternary positive electrode materials play different roles. The valence state of the Ni element changes during charging/discharging, providing charge compensation inside the materials in the intercalation/deintercalation process of lithium ions. It is a major contributor to capacity and energy. The Co element has two itinerant electrons, which can provide the materials with electronic conductivity and can also provide capacity and energy by the change of valence state. The Mn/Al elements make the crystal structures of the materials more stable, which can improve the stability of the materials in the deintercalation process of lithium.

The Co element is very important for the kinetic performances of ternary positive electrode materials. However, as a precious metal, it has a low abundance, and a higher price than the other two main metal elements. In order to reduce the cost of ternary positive electrode materials, it is necessary to reduce the amount of the Co element while maintaining the performances.

One of the effective measures to improve the utilization rate of Co is to adjust the spatial distribution of different metal elements. WO2019120973A1 provides a method for preparing a ternary positive electrode material having a single-crystal morphology and a gradient concentration. However, the material and method described in this patent application are only directed to ternary Li-containing compounds having a Co content of >10%, and the design of the gradient concentration is not applicable in cases where the Co content is lower. WO2021153546A1 describes a method for preparing a Co-coated ternary positive electrode active material. However, the process of Co coating is performed at a temperature of 700° C. or higher. At such a temperature, the other oxide particles contributing to the material performances are difficult to be coated effectively. In view of the above, there is a need for a novel method for manufacturing a product with high kinetic performances, where the product has both a low Co content and a surface coating.

SUMMARY

In allusion to the deficiencies in the prior art, one object of the present disclosure is to provide a ternary positive electrode material, a method for preparing the same, a positive electrode sheet, and a lithium ion battery.

The object of the present disclosure is fulfilled by the following technical solutions:

In a first aspect according to the present disclosure, there is provided a ternary positive electrode material, wherein the ternary positive electrode material has a chemical composition of $Li_a(Ni_xCo_yM_{1-x-y})_{1-b}M'_bO_{2-c}A_c$, wherein $0.75{\leq}a{\leq}1.2$, $0.5{\leq}x{<}1$, $0{<}y{\leq}0.1$, $0{\leq}b{\leq}0.01$, $0{\leq}c{\leq}0.2$; M is at least one selected from the group consisting of Mn and Al; M' includes one or more selected from the group consisting of Al, Zr, Ti, Y, Sr, W and Mg; and A is one or more selected from the group consisting of S, F and N.

In some embodiments, M' is one or more selected from the group consisting of Al, Zr, Ti, Y, Sr, W and Mg. In some embodiments, M' includes Al and optionally one or more selected from the group consisting of Zr, Ti, Y, Sr, W and Mg. In some embodiments, M' consists of Al and optionally one or more selected from the group consisting of Zr, Ti, Y, Sr, W and Mg. In some embodiments, M' includes Al and one or more selected from the group consisting of Zr, Ti, Y, Sr, W and Mg. In some embodiments, M' consists of Al and one or more selected from the group consisting of Zr, Ti, Y, Sr, W and Mg. In some embodiments, M' includes Al and Zr. In some embodiments, M' consists of Al and Zr.

In some embodiments, $0.95{\leq}a{\leq}1.1$, for example, $0.99{\leq}a{\leq}1.05$.

In some embodiments, $0.55{\leq}x{<}0.76$, for example, $0.6{\leq}x{<}0.76$.

In the chemical composition $Li_a(Ni_xCo_yM_{1-x-y})_{1-b}M'_bO_{2-c}A_c$ of the ternary positive electrode material according to the present disclosure, $y{\leq}0.1$, so the ternary positive electrode material according to the present disclosure is a low-cobalt ternary positive electrode material. In some embodiments, $0.05{<}y{\leq}0.1$, for example, $0.06{<}y{\leq}0.09$.

In some embodiments, $0{<}b{\leq}0.01$, for example, $0.001{\leq}b{\leq}0.005$.

In some embodiments, c is 0, i.e. A element is absent.

In the ternary positive electrode material according to the present disclosure, $2\%{\leq}C_{Co1}-C_{co}$, wherein $C_{Co1}$ is an atomic percentage of Co element with respect to all metal elements except Li element measured by X-ray photoelectron spectroscopy (XPS) after etching of the positive electrode material, and $C_{Co}$ is an atomic percentage of Co element with respect to all metal elements except Li element obtained by analyzing the positive electrode material with inductively coupled plasma (ICP). In some embodiments, $C_{Co1}$ is an atomic percentage of Co element with respect to all metal elements except Li element measured by XPS at a depth of about 20-60 nm from the surface after etching of the positive electrode material. In the ternary positive electrode material having this technical feature, the Co content at the depth of about 20-60 nm from the surface ($C_{Co1}$) is significantly higher than the Co content in the bulk phase ($C_{Co}$), achieving better kinetic performances. The reason is that, in the working process of the lithium ion battery, the resistance of electrons transfer and Li ions migration at the interface (at the solid-liquid interface between the electrolyte and the positive electrode material) is larger than that in the bulk phase (inside the positive electrode material), and Co has a positive effect on both the structural stability of the ternary positive electrode material and the ionic/electronic conductivity. When more Co is enriched on the surface of the material, the transport rates of electrons and Li ions across the interface are increased, so that the migration rates of electrons and Li ions on the surface of the material match the migration rates in the bulk phase. As a result, the kinetic performances of the material are fully utilized. And if the enrichment of the Co element only resides on the surface of the material or at a depth of <20 nm, the Co-rich coating is susceptible to damage in the charge/discharge cycles of the battery, such that the kinetic performances of the material cannot be maintained. Because the Co content on the surface of the ternary positive electrode material according to the present disclosure is higher than the Co content in the bulk material after etching, better kinetic performances can be maintained for a long term during the use of the material.

In the ternary positive electrode material according to the present disclosure, $5\% \leq C_{Al} - C_{Al1}$, wherein $C_{Al}$ is an atomic percentage of Al element with respect to all metal elements except Li element obtained by analyzing the positive electrode material directly with XPS, and $C_{Al1}$ is an atomic percentage of Al element with respect to all metal elements except Li element measured by XPS after etching of the positive electrode material. In some embodiments, $C_{Al1}$ is an atomic percentage of Al element with respect to all metal elements except Li element measured by XPS at a depth of about 20-60 nm from the surface after etching of the positive electrode material. The Al content ($C_{Al}$) on the surface of the ternary positive electrode material having this technical feature is significantly higher than the Al content ($C_{Al1}$) at the depth of about 20-60 nm from the surface, and this ternary positive electrode material has more excellent cycling stability. The reason is that the Al element forms a coating in the form of oxide over the surface of the material, and this coating can reduce side reaction of the high valent metal ions in the ternary material with an electrolyte. And if Al enters the crystal lattice of the material, the diffusion rate of Li ions in the material and the electronic conductivity of the material will be decreased, resulting in a lower specific capacity of the material. The surface Al content of the ternary positive electrode material before etching is significantly higher than the surface Al content of the material after etching according to the present disclosure. As a result, better cycling stability can be achieved while it can be ensured that the capacity and kinetic performances of the material will not be affected.

In some embodiments, $C_{Al} - C_{Al1} \geq 5.3\%$, for example, $\geq 7.5\%$. Preferably, $10\% \leq C_{Al} - C_{Al1}$.

Preferably, $10\% \leq C_{Al} - C_{Al1} \leq 20\%$.

In some embodiments, $C_{Co1} - C_{Co} \geq 2.7\%$, for example, $\geq 3.2\%$. Preferably, $5\% \leq C_{Co1} - C_{Co}$.

Preferably, $5\% \leq C_{Co1} - C_{Co} \leq 11\%$.

Preferably, the etching conditions are: $Ar^+$ ion etching, $2,500\ eV \leq E \leq 3,500\ eV$, $90\ s \leq t \leq 100\ s$. E is energy used for etching, and t is etching time.

Preferably, the ternary positive electrode material has a single-crystal or single-crystal-like morphology.

Preferably, when the cumulative particle volume distribution of the ternary positive electrode material reaches 50%, the corresponding particle size $D_{v50}$ satisfies $2\ \mu m \leq D_{v50} \leq 5\ \mu m$. It means that each particle size greater or smaller than $D_{v50}$ takes account of 50% of the total particles, wherein $D_{v50}$ is in the range of 2-5 μm. This is a common way to describe particle size measurement.

In a second aspect according to the present disclosure, there is provided a method for preparing the ternary positive electrode material according to any embodiment described herein, comprising the following steps:

Step S1: mixing a ternary positive electrode precursor containing Ni, Co, Mn or Ni, Co, Al with a lithium source fully to form a mixture I, wherein a compound containing M' element such as an oxide of M' element may be added or not added in this process, the M' element being preferably M' element except Al, for example, being one or more elements selected from the group consisting of Zr, Ti, Y, Sr, W and Mg; wherein a compound containing A element such as an acid or salt containing anionic A may be added or not added in this process;

Step S2: heating the mixture I in an air or oxygen atmosphere, wherein the mixture I needs to be held at 700-1,100° C. for 4-15 hours, followed by rolling and pulverization to obtain an intermediate product II;

Step S3: mixing the intermediate product II with an Al-containing solid powder and a Co-containing solid powder fully to form a mixture III, wherein a compound containing M' element such as an oxide of M' element may be added or not added in this process, the M' element being preferably M' element except Al, for example, being one or more elements selected from the group consisting of Zr, Ti, Y, Sr, W and Mg; wherein a compound containing A element such as an acid or salt containing anionic A may be added or not added in this process;

Step S4: heating the mixture III in an air or oxygen atmosphere, wherein the mixture III needs to be held at 700-1,000° C. for 4-15 hours, followed by rolling and pulverization to obtain a ternary positive electrode material having an $\alpha$-$NaFeO_2$ structure.

According to the present disclosure, the ternary positive electrode material may comprise the M' element including one or more elements selected from the group consisting of Zr, Ti, Y, Sr, W and Mg; alternatively, it does not comprise any of these elements. One or more elements selected from the group consisting of Zr, Ti, Y, Sr, W and Mg may be used as a doping element and/or coating element in the ternary positive electrode material.

In some embodiments, the M' element in the ternary positive electrode material includes one or more elements selected from the group consisting of Zr, Ti, Y, Sr, W and Mg, wherein a compound comprising one or more elements selected from the group consisting of Zr, Ti, Y, Sr, W and Mg may be added as the M' element in the process of forming the mixture I and/or the process of forming the mixture III. The compound which comprises one or more elements selected from the group consisting of Zr, Ti, Y, Sr, W and Mg as the M' element and which is added in the process of forming the mixture I may act as a dopant for the ternary positive electrode material. The compound which comprises one or more elements selected from the group consisting of Zr, Ti, Y, Sr, W and Mg as the M' element and which is added in the process of forming the mixture III may act as a coating agent for the ternary positive electrode material.

The compound containing the M' element suitable for the present disclosure includes but is not limited to oxides of the M' element, hydroxides containing the M' element, etc.

In some embodiments, the ternary positive electrode material comprises A element, wherein a compound containing the A element is added in the process of forming the mixture I and/or the process of forming the mixture III. The compound which contains the A element and is added in the process of forming the mixture I and in the process of forming the mixture III may act as a modifier for the ternary positive electrode material.

In some embodiments, the ternary positive electrode material comprises A element, wherein a compound containing the A element is added in the process of forming the mixture III.

The compound containing the A element suitable for the present disclosure includes but is not limited to acids or salts containing anionic A. Preferably, the salt or acid salt containing anionic A may be one or more selected from the group consisting of ammonium fluoride, lithium fluoride, ammonium nitrate, lithium nitrate, ammonium sulfate, ammonium bisulfate, lithium sulfate, lithium bisulfate, ammonium sulfide, ammonium hydrosulfide, lithium sulfide and lithium hydrosulfide.

In some embodiments, the M' element in the ternary positive electrode material includes one or more elements selected from the group consisting of Zr, Ti, Y, Sr, W and Mg, wherein in Step S1, a compound comprising one or more elements selected from the group consisting of Zr, Ti, Y, Sr, W and Mg is further added in the process of forming the mixture I.

In some embodiments, the ternary positive electrode material comprises A element, wherein in Step S3, a compound containing the A element is further added in the process of forming the mixture III.

In some embodiments, in Step S1, the lithium source is one or more selected from the group consisting of lithium carbonate and lithium hydroxide.

In some embodiments, in Step S1, if the M' element in the ternary positive electrode material comprises Zr element, a Zr-containing compound is further added in the process of forming the mixture I.

Preferably, in Step S1, the Zr-containing compound is any one or more selected from the group consisting of $ZrO_2$ and $Zr(OH)_4$.

In some embodiments, in Step S3, the Al-containing solid powder is an alumina powder having a particle size in the range of $100 \text{ nm} \leq D_{alumina} \leq 1,000 \text{ nm}$. For example, $D_{alumina}$ may be 100 nm, 150 nm, 200 nm, 300 nm, 400 nm, 500 nm, etc.

Preferably, in Step S3, the Co-containing solid powder is any one or more selected from the group consisting of $Co_3O_4$, $CoO$, $Co(OH)_2$, $CoOOH$ and $CoCO_3$.

In some embodiments, in Step S3, a molar ratio of Co element in the Co-containing solid powder to the intermediate product II is (1-3):100, for example, 1:100, 1.5:100, 2:100, 2.5:100, etc.

In some embodiments, in Step S3, a mass ratio of Al element in the Al-containing solid powder to the intermediate product II is (0.02-1.5):100, for example, 0.1:100, 0.15:100, 0.2:100, 0.25:100, 0.3:100, 0.5:100, 1:100, etc.

In a third aspect according to the present disclosure, there is provided a positive electrode sheet comprising the ternary positive electrode material according to any embodiment described herein.

The ternary positive electrode material and the positive electrode sheet according to the present disclosure may be used for lithium ion batteries.

In a fourth aspect according to the present disclosure, there is provided a lithium ion battery comprising the positive electrode sheet according to any embodiment described herein.

The design concept according to the present disclosure is as follows: the Co element in the ternary positive electrode material has the characteristic of high electronic conductivity, and can stabilize the layered structure of the material. Thus, the ternary positive electrode material having a relatively high Co content often shows better kinetic performances and surface stability. However, the content of the Co element in the earth is low, and thus its cost is high. In order to obtain an NCM ternary positive electrode material having better performances at the same proportion, Co may be coated on the surface of the material. However, a high temperature (>800° C.) is required for Co to form an effective structure. This high temperature renders it impossible to use Co together with other coating agents commonly used for ternary positive electrode materials, especially $Al_2O_3$ which can suppress surface side reactions effectively. When $Al_2O_3$ is used as a coating agent and the surface of the material experiences high-temperature treatment (>800° C.), the Al element will enter the crystal lattice of the ternary positive electrode material. On the one hand, Al loses its effect of surface protection; and on the other hand, deintercalation of lithium ions in the material becomes difficult, such that the specific capacity of the material is decreased, and the impedance is increased. In the ternary positive electrode material provided according to the present disclosure, the Co element is enriched on the surface while it's ensured that the Al element will not enter the bulk phase of the material in a large amount. Hence, the kinetic performances of the material and its stability in long-term cycles can be balanced. In order to achieve this effect, before the material is subjected to secondary sintering according to the present disclosure, a Co-containing solid powder is chosen to be added as a coating agent, and at the same time, an Al-containing solid powder having a large particle size is added. In contrast to the nano-sized small particle alumina coating agent generally used in the present industry, the large particle aluminum-containing solid powder has a higher melting point, and a higher temperature is required for it to undergo solid phase reaction with the intermediate product of the ternary positive electrode material obtained by the primary sintering because of its smaller contact area with the intermediate product, so that in the high-temperature coating process described in the present disclosure, Co can be enriched on the surface and near the surface of the material, while more Al remains on the surface of the material.

The present disclosure has the following beneficial effects in comparison with the prior art:

(1) Co in the ternary positive electrode material according to the present disclosure is less than 10%, which can reduce the cost of the material significantly. A portion of the Co element is enriched on the surface of the material, such that the resistance of Li ions migration and electrons transfer at the interface is weakened, and thus the material exhibits excellent kinetic performances. Moreover, the enrichment of the Co element near the surface of the material makes the proportion of the Co element near the surface is higher than the average proportion of the Co element in the material, which guarantees the better kinetic performances of the material in a long-term cycling process. In addition, the surface of the material is further coated with the Al element, and the Al element does not infiltrate during the sintering process, thereby developing a notable concentration difference (≥5%) between the surface of the material and the region near the surface. The Al element can form aluminum oxides or lithium-containing aluminates which have an inhibitory effect on the surface side reactions of the material during charging/discharging of the battery, thereby further extending the cycle life of the material.

(2) When the material is processed with the method according to the present disclosure, a surface structure of the material can be etched to about 20-60 nm, thereby exposing the elemental composition near the surface. A material still having a high Co content at this depth will have better kinetic performances in a long-term cycling process.

(3) The positive electrode material according to the present disclosure preferably comprises particles having a single-crystal or single-crystal-like morphology. Hence, compared with a polycrystalline material, it has fewer cracks generated due to lattice constant change during charging/discharging, and thus it is more stable.

(4) The particle size of the positive electrode material according to the present disclosure is preferably in the range of 2-5 μm when the cumulative volume distribution reaches 50%. At this time, the exposed active area of the material is moderate. Neither the transport path of lithium ions in the solid will be too long for the reason that the particles are too large, nor the surface structure will deteriorate quickly for the reason that the particles are too small.

(5) The preparation method according to the present disclosure includes conventional mixing and sintering processes, wherein the temperature (700-1,100° C.) employed in Step S4 is higher than that employed in ordinary processes. At this time, if conventional high-activity small-particle nano-oxides are chosen as a coating material to be added in Step S3, it will be extremely easy for this coating material to penetrate into the bulk phase of the material at high temperature, and thus the purpose of coating cannot be fulfilled. Therefore, it is preferable to use aluminum-containing particles having a particle size of 100 nm or larger for coating, and their lower reactivity is exploited to control the reaction rate and retain their effect on the surface of the material.

(6) The positive electrode sheet and the lithium ion battery made using the positive electrode material according to the present disclosure have better short-term kinetic performances and long-term kinetic performances, and they also exhibit excellent stability in long-term cycles.

DETAILED DESCRIPTION

The present disclosure will be illustrated in detail with reference to the following specific Examples. The following Examples will help those skilled in the art to further understand the present disclosure, but do not limit the present disclosure in any way. It should be noted that, for those skilled in the art, variations and modifications can be made without departing from the concept of the present disclosure. They all fall in the protection scope of the present disclosure.

Example 1

A $Ni_{0.66}Co_{0.06}Mn_{0.28}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 940° C. at a rate of 5° C./min and held for 8 hours.

After the resulting block material was cooled, it was subjected to rolling and fed into a jet mill for pulverization to obtain a primarily sintered product (an intermediate product II). The primarily sintered product was mixed with $Co(OH)_2$ at a molar ratio of 2.0% and $Al_2O_3$ powder (having a primary particle size of about 150 nm) at a mass ratio of 0.25 wt % uniformly in a high-speed mixer to obtain a mixture (mixture III). The mixture III was loaded into a sagger which was then placed in the roller kiln. Then, the temperature in the roller kiln was raised to 850° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 2.3 μm.

The composition of the material was $Li_{0.99}(Ni_{0.65}Co_{0.08}Mn_{0.27})_{0.998}Zr_{0.001}Al_{0.001}O_2$ as determined by ICP, that is, $C_{Co}=7.98\%$; the percentages of the metal elements except Li on the surface were determined by XPS as follows: 20.2% Al, 14.1% Co, 29.1% Mn, 33.7% Ni, 2.9% Zr, that is, $C_{Al}=20.2\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 10.2% Al, 17.5% Co, 30.7% Mn, 40.1% Ni, 1.5% Zr, that is, $C_{Co1}=17.5\%$, $C_{Al1}=10.2\%$.

Example 2

A $Ni_{0.66}Co_{0.06}Mn_{0.28}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 940° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 1.0% and $Al_2O_3$ powder (having a primary particle size of about 110 nm) at a mass ratio of 0.20 wt % uniformly in a high-speed mixer to obtain a mixture (mixture III). The mixture III was loaded into a sagger which was then placed in the roller kiln. Then, the temperature in the roller kiln was raised to 820° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 2.5 μm.

The composition of the material was $Li_{1.01}(Ni_{0.65}Co_{0.07}Mn_{0.28})_{0.9975}Zr_{0.001}Al_{0.0015}O_2$ as determined by ICP, that is, $C_{Co}=6.98\%$; the percentages of the metal elements except Li on the surface were determined by XPS as follows: 25.7% Al, 7.8% Co, 31.0% Mn, 33.1% Ni, 2.4% Zr, that is, $C_{Al}=25.7\%$. $Ar^+$ ions were used to etch the material, and the conditions were chosen as follows: spot width 1.5 mm, energy 2,700 eV, duration 95 s. After the material was treated by etching, the percentages of the metal elements except Li on the surface were determined by XPS as follows: 9.4% Al, 9.7% Co, 38.7% Mn, 41.0% Ni, 1.2% Zr, that is, $C_{Co1}$=9.7%, $C_{Al1}$=9.4%.

Example 3

A $Ni_{0.64}Co_{0.06}Mn_{0.30}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 940° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 2.5% and $Al_2O_3$ powder (having a primary particle size of about 200 nm) at a mass ratio of 0.15 wt % uniformly in a high-speed mixer to obtain a mixture (mixture III). The mixture III was loaded into a sagger which was then placed in the roller kiln. Then, the temperature in the roller kiln was raised to 840° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 2.7 μm.

The composition of the material was $Li_{1.03}(Ni_{0.63}Co_{0.08}Mn_{0.29})_{0.9978}Zr_{0.001}Al_{0.0012}O_2$ as determined by ICP, that is, $C_{Co}$=7.98%; the percentages of the metal elements except Li on the surface were determined by XPS as follows: 19.7% Al, 13.0% Co, 29.1% Mn, 33.7% Ni, 4.5% Zr, that is, $C_{Al}$=19.7%. Ar$^+$ ions were used to etch the material, and the conditions were chosen as follows: spot width 1.5 mm, energy 3300 eV, duration 90 s. After the material was treated by etching, the percentages of the metal elements except Li on the surface were determined by XPS as follows: 12.2% Al, 18.5% Co, 29.7% Mn, 38.6% Ni, 1.0% Zr, that is, $C_{Co1}$=18.5%, $C_{Al1}$=12.2%.

Example 4

A $Ni_{0.61}Co_{0.07}Mn_{0.32}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 930° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 1.5% and $Al_2O_3$ powder (having a primary particle size of about 300 nm) at a mass ratio of 0.20 wt % uniformly in a high-speed mixer to obtain a mixture. The mixture was loaded into a sagger which was then placed in the roller kiln. Then, the temperature in the roller kiln was raised to 840° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 2.5 μm.

The composition of the material was $Li_{1.03}(Ni_{0.60}Co_{0.09}Mn_{0.31})_{0.9979}Zr_{0.001}Al_{0.0011}O_2$ as determined by ICP, that is, $C_{Co}$=8.98%; the percentages of the metal elements except Li on the surface were determined by XPS as follows: 27.3% Al, 10.5% Co, 27.8% Mn, 31.9% Ni, 2.5% Zr, that is, $C_{Al}$=27.3%. Ar$^+$ ions were used to etch the material, and the conditions were chosen as follows: spot width 1.5 mm, energy 3,400 eV, duration 90 s. After the material was treated by etching, the percentages of the metal elements except Li on the surface were determined by XPS as follows: 8.0% Al, 14.4% Co, 35.7% Mn, 39.9% Ni, 2.0% Zr, that is, $C_{Co1}$=14.4%, $C_{Al1}$=8.0%.

Example 5

A $Ni_{0.61}Co_{0.07}Mn_{0.32}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 930° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 2.0% and $Al_2O_3$ powder (having a primary particle size of about 150 nm) at a mass ratio of 0.16 wt % uniformly in a high-speed mixer to obtain a mixture. The mixture was loaded into a sagger which was then placed in the roller kiln. Then, the temperature in the roller kiln was raised to 850° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 3.1 μm.

The composition of the material was $Li_{1.03}(Ni_{0.60}Co_{0.09}Mn_{0.31})_{0.998}Zr_{0.001}Al_{0.001}O_2$ as determined by ICP, that is, $C_{Co}$=8.98%; the percentages of the metal elements except Li on the surface were determined by XPS as follows: 22.1% Al, 12.5% Co, 29.0% Mn, 34.7% Ni, 1.7% Zr, that is, $C_{Al}$=22.1%. Ar$^+$ ions were used to etch the material, and the conditions were chosen as follows: spot width 1.5 mm, energy 2,600 eV, duration 100 s. After the material was treated by etching, the percentages of the metal elements except Li on the surface were determined by XPS as follows: 10.8% Al, 16.6% Co, 31.7% Mn, 38.6% Ni, 2.3% Zr, that is, $C_{Co1}$=16.6%, $C_{Al1}$=10.8%.

Example 6

A $Ni_{0.61}Co_{0.07}Mn_{0.32}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 930° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 2.5% and $Al_2O_3$ powder (having a primary particle size of about 150 nm) at a mass ratio of 0.12 wt % uniformly in a high-speed mixer to obtain a mixture. The mixture was loaded into a sagger which was then placed in the roller kiln. Then, the temperature in the roller kiln was raised to 860° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 3.6 μm.

The composition of the material was $Li_{1.03}$ $(Ni_{0.60}Co_{0.09}Mn_{0.31})_{0.998}Zr_{0.001}Al_{0.001}O_2$ as determined by ICP, that is, $C_{Co}=8.98\%$; the percentages of the metal elements except Li on the surface were determined by XPS as follows: 18.8% Al, 14.2% Co, 28.6% Mn, 35.9% Ni, 2.5% Zr, that is, $C_{Al}=18.8\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 13.5% Al, 17.4% Co, 30.3% Mn, 36.7% Ni, 2.1% Zr, that is, $C_{Co1}=17.4\%$, $C_{Al1}=13.5\%$.

Example 7

The difference between this Example and Example 1 lies in that no $ZrO_2$ powder was added after the precursor and lithium carbonate were mixed. The positive electrode material product had a single-crystal morphology, and its particle size $D_{v50}$ corresponding to a cumulative particle volume distribution of 50% was 3.6 μm.

The composition of the material was $Li_{0.99}$ $(Ni_{0.65}Co_{0.08}Mn_{0.27})_{0.999}Al_{0.001}O_2$ as determined by ICP, that is, $C_{Co}=7.99\%$; the percentages of the metal elements except Li on the surface were determined by XPS as follows: 20.7% Al, 14.9% Co, 30.1% Mn, 34.3% Ni, that is, $C_{Al}=20.7\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 10.5% Al, 18.0% Co, 31.2% Mn, 40.3% Ni, that is, $C_{Co1}=18.0\%$, $C_{Al1}=10.5\%$.

Example 8

A $Ni_{0.77}Co_{0.04}Al_{0.19}(OH)_2$ precursor was selected for mixing with lithium carbonate. A molar ratio of the precursor:lithium was 1:1.05. A 0.12 wt % (with respect to the precursor) nano-sized $ZrO_2$ powder was added and mixed uniformly in a high-speed mixer to obtain a mixture I. The mixture I was loaded into a sagger which was then placed in a roller kiln. Then, the temperature in the roller kiln was raised to 930° C. at a rate of 5° C./min and held for 8 hours. After the resulting block material was cooled, it was subjected to rolling and fed into a jet mill for pulverization to obtain a primarily sintered product (an intermediate product II). The primarily sintered product was mixed with $Co(OH)_2$ at a molar ratio of 2.5% and $Al_2O_3$ powder (having a primary particle size of about 150 nm) at a mass ratio of 0.12 wt % uniformly in a high-speed mixer to obtain a mixture. The mixture was loaded into a sagger which was then placed in the roller kiln. Then, the temperature in the roller kiln was raised to 840° C. at a rate of 10° C./min and held for 5 hours to perform the secondary sintering. After cooling, the powder was a positive electrode material product. The positive electrode material product had a single-crystal morphology, and its particle size $D_{v50}$ corresponding to a cumulative particle volume distribution of 50% was 2.6 μm.

The composition of the material was $Li_{1.02}$ $(Ni_{0.76}Co_{0.06}Al_{0.18})_{0.999}Zr_{0.001}O_2$ as determined by ICP, that is, $C_{Co}=5.99\%$; the percentages of the metal elements except Li on the surface were determined by XPS as follows: 26.8% Al, 11.2% Co, 59.1% Ni, 2.9% Zr, that is, $C_{Al}=26.8\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 16.5% Al, 9.2% Co, 71.6% Ni, 2.7% Zr, that is, $C_{Co1}=9.2\%$, $C_{Al1}=16.5\%$.

Comparative Example 1

The difference between this Comparative Example and Example 1 lies in that no $Al_2O_3$ powder was added for the secondary sintering. The rest conditions and processes for preparing the material are consistent with Example 1. The positive electrode material product had a single-crystal morphology, and its particle size $D_{v50}$ corresponding to a cumulative particle volume distribution of 50% was 2.3 μm.

The composition of the material was $Li_{1.01}$ $(Ni_{0.65}Co_{0.07}Mn_{0.28})_{0.999}Zr_{0.001}O_2$ as determined by ICP, that is, $C_{Co}=6.99\%$; the percentages of the metal elements except Li on the surface were determined by XPS as follows: 0% Al (N.D), 10.9% Co, 40.4% Mn, 44.1% Ni, 4.6% Zr, that is, $C_{Al}=0\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 0% Al (N.D), 9.5% Co, 42.7% Mn, 45.4% Ni, 2.4% Zr, that is, $C_{Co1}=9.5\%$, $C_{Al1}=0\%$.

Comparative Example 2

The difference between this Comparative Example and Example 1 lies in that $Co(OH)_2$ was not added for the secondary sintering. The rest conditions and processes for preparing the material are consistent with Example 1. The positive electrode material product had a single-crystal morphology, and its particle size $D_{v50}$ corresponding to a cumulative particle volume distribution of 50% was 2.3 μm.

The composition of the material was $Li_{1.01}$ $(Ni_{0.66}Co_{0.06}Mn_{0.28})_{0.9975}Zr_{0.001}Al_{0.0015}O_2$ as determined by ICP, that is, $C_{Co}=5.99\%$; the percentages of the metal elements except Li on the surface were determined by XPS as follows: 27.3% Al, 4.1% Co, 32.3% Mn, 34.9% Ni, 1.4% Zr, that is, $C_{Al}=27.3\%$. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 8.2% Al, 6.3% Co, 39.6% Mn, 43.0% Ni, 2.9% Zr, that is, $C_{Co1}=6.3\%$, $C_{Al1}=8.2\%$.

Comparative Example 3

The difference between this Comparative Example and Example 1 lies in that neither $Al_2O_3$ powder nor $Co(OH)_2$ was added for the secondary sintering. The rest conditions and processes for preparing the material are consistent with Example 1. The positive electrode material product had a single-crystal morphology, and its particle size $D_{v50}$ corresponding to a cumulative particle volume distribution of 50% was 2.3 μm.

The composition of the material was $Li_{1.01}$ $(Ni_{0.66}Co_{0.06}Mn_{0.28})_{0.999}Zr_{0.001}O_2$ as determined by ICP, that is, $C_{Co}$=5.99%; the percentages of the metal elements except Li on the surface were determined by XPS as follows: 0% Al (N.D), 6.7% Co, 39.8% Mn, 51.3% Ni, 2.2% Zr, that is, $C_{Al}$=0%. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 0% Al (N.D), 7.1% Co, 37.3% Mn, 52.9% Ni, 2.7% Zr, that is, $C_{Co1}$=7.1%, $C_{Al1}$=0%.

Comparative Example 4

The difference between this Comparative Example and Example 1 lies in that $Al_2O_3$ added for the secondary sintering in this Comparative Example had a primary particle size of 10 nm. The rest conditions and processes for preparing the material are consistent with Example 1. The positive electrode material product had a single-crystal morphology, and its particle size $D_{v50}$ corresponding to a cumulative particle volume distribution of 50% was 2.3 μm.

The composition of the material was $Li_{1.01}$ $(Ni_{0.65}Co_{0.07}Mn_{0.28})_{0.9975}Zr_{0.001}Al_{0.0015}O_2$ as determined by ICP, that is, $C_{Co}$=6.98%; the percentages of the metal elements except Li on the surface were determined by XPS as follows: 19.3% Al, 9.2% Co, 28.7% Mn, 40.3% Ni, 2.5% Zr, that is, $C_{Al}$=19.3%. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 18.2% Al, 10.1% Co, 30.3% Mn, 39.6% Ni, 1.8% Zr, that is, $C_{Co1}$=10.1%, $C_{Al1}$=18.2%.

Comparative Example 5

The difference between this Comparative Example and Example 1 lies in that the temperature chosen for the secondary sintering in this Comparative Example was 550° C. The rest conditions and processes for preparing the material are consistent with Example 1. The positive electrode material product had a single-crystal morphology, and its particle size $D_{v50}$ corresponding to a cumulative particle volume distribution of 50% was 2.1 μm.

The composition of the material was $Li_{0.01}$ $(Ni_{0.65}Co_{0.07}Mn_{0.28})_{0.9975}Zr_{0.001}Al_{0.0015}O_2$ as determined by ICP, that is, $C_{Co}$=6.98%; the percentages of the metal elements except Li on the surface were determined by XPS as follows: 23.1% Al, 15.6% Co, 24.4% Mn, 34.8% Ni, 2.1% Zr, that is, $C_{Al}$=23.1%. $Ar^+$ ions were used to etch the material, and the conditions were chosen as follows: spot width 1.5 mm, energy 3,000 eV, duration 100 s. After the material was treated by etching, the percentages of the metal elements except Li on the surface were determined by XPS as follows: 15.5% Al, 8.3% Co, 33.2% Mn, 40.3% Ni, 2.7% Zr, that is, $C_{Co1}$=8.3%, $C_{Al1}$=15.5%.

The positive electrode material products prepared in the above Examples and Comparative Examples were used to prepare batteries according to the following method:

The positive electrode active material was mixed with carbon black as a conductive agent and polyvinylidene fluoride (PVDF) as a binder at a mass ratio of 97:1.7:1.3, added into N-methyl pyrrolidone (NMP) as an organic solvent, and stirred at a high speed to form a uniform dispersion. After the high-speed stirring was completed, the dispersion was defoamed in the stirring tank under negative pressure to obtain a positive electrode slurry suitable for coating. The resulting positive electrode slurry was coated on an aluminum foil with a transfer coating machine. After drying, cold pressing and slitting, a positive electrode sheet in a desired shape was made. In the cold pressing process, the compact density of the area coated with the positive electrode active material was controlled within 3.2 g/cm³- 3.6 g/cm³.

A negative electrode active material was mixed with carbon black as a conductive agent, a binder and sodium carboxymethylcellulose (CMC-Na) at a mass ratio of 96.8: 1.2:1.2:0.8, added into deionized water, and stirred at a high speed to form a uniform dispersion. After the high-speed stirring was completed, the dispersion was defoamed in the stirring tank under negative pressure to obtain a negative electrode slurry suitable for coating. The resulting negative electrode slurry was coated on a copper foil with a transfer coating machine. After drying, cold pressing and slitting, a negative electrode sheet in a desired shape was made. In the cold pressing process, the compact density of the area coated with the negative electrode active material was controlled within 1.5 g/cm³-1.8 g/cm³.

The positive and negative electrode sheets were disposed on two sides of a 9 μm thick PE separator respectively, and rolled up to form a roll core. An uncoated area of each of the electrode sheets was reserved and connected to a nickel tab by ultrasonic welding. The roll core was wrapped with an aluminum-plastic film and heat-sealed, and one side was reserved for liquid infusion.

To make an electrolyte, a mixed solvent of EC:EMC:DEC at a mass ratio of 3:5:2 were added with 13 wt % (based on the total mass of the electrolyte) of $LiPF_6$ as a lithium salt, and, as additives, 1 wt % (based on the total mass of the electrolyte) of vinylene carbonate and 2 wt % (based on the total mass of the electrolyte) of ethylene sulfate (DTD). The electrolyte was infused into the aluminum plastic film wrapping the roll core. Lithium ion batteries were obtained by further processes of vacuum packaging, standing and forming.

The positive electrode materials and the resulting batteries were tested for their performances. The results are shown in Table 1. The test methods are as follows:

Particle size $D_{v50}$ test: 5 g of a ternary positive electrode material sample was weighed and put in a 100 mL beaker to which 50 mL deionized water and 1 mL sodium hexametaphosphate solution (concentration: 1 wt %) were then added. The resulting mixture was ultrasonicated for 1 min, and then transferred to an injection system of Malvern 3000 Laser Particle Size Analyzer. The total volume of the sample and deionized water was kept at 500 mL. The agitator speed was set to 2,800 rpm. The particle refractive index was 1.8, the particle absorptivity was 1.0, and the solvent refractive index was 1.33. The particle size distribution was determined under these conditions, and $D_{v50}$ in the volume distribution data was read.

ICP test: 0.4 g of a positive electrode material sample was weighed and put in a 250 ml beaker to which 10 ml HCl (1:1 by volume of HCl: water) was then added. The sample was dissolved by heating at 180° C. The heated liquid was transferred to a volumetric flask, and pure water was added to its constant volume. The liquid was diluted to a measurable range, and tested using an ICP instrument. In the chemical formula $Li_a(Ni_xCo_yM_{1-x-y})_{1-b}M'_bO_{2-c}A_c$ of the positive electrode material, the x and y values were calculated by comparing the relative contents of the Ni, Co, and Mn elements determined by the ICP test, and a, b, and c were determined by ICP directly. If M' and A each included more than one element, b and c each were equal to a sum of the contents of different elements.

XPS test: A positive electrode material powder sample was spread on an aluminum foil to which a double-sided adhesive tape was adhered. The sample was flattened using a tablet press, and then the material was tested using an XPS instrument. In the test process, a full-spectrum scan might be performed first to determine possible elements, and then a narrow-spectrum scan was performed for the existing elements. The relative atomic content of each element was calculated based on the area of the signal peak in view of the sensitivity factor of the element.

Etching: $Ar^+$ ion etching was utilized: spot width 1.5 mm, 2,500 eV$\leq$E$\leq$3,500 eV, 90 s$\leq$t$\leq$100 s. E was the energy used for etching, and t was the etching time. The material was treated. After the treatment, the material was tested using the XPS instrument. See the Examples and Comparative Examples for the specific etching parameters. The relative atomic content of an element determined by the XPS test after the positive electrode material was etched under the above conditions ($Ar^+$ ion etching, spot width 1.5 mm, 2,500 eV$\leq$E$\leq$3,500 eV, 90 s$\leq$t$\leq$100 s) was a relative atomic content of the element at a depth of 20-60 nm from the surface.

Direct current internal resistance (DCR) test: The DCR of a battery could serve as an indicator of the kinetic performance of the cathode material when other design and materials are fixed, especially at low state of charge (SOC), when the cathode lattice is nearly fully inserted with Li ions. The SOC of a battery was adjusted to 10% (i.e. charging the battery from a fully discharged state to 10% of its rated capacity) at a rate of 0.33C (i.e. at a current set to 0.33 time the rated capacity of the battery in ampere hours) using a charge/discharge device. After standing for 30 minutes, the battery was discharged at a 3C constant current A, and the voltage change $\Delta V$ during the discharge process was recorded. Then, DCR=$\Delta V$/A.

Cycle life: The battery was subjected to charge/discharge cycles at a rate of 1C using the charge/discharge device, and the capacity retention rate after 1,000 cycles was recorded.

DCR growth rate test: For the battery obtained after 1,000 cycles, the state of charge (SOC) of the battery was adjusted to 50% (i.e. charging the battery from a fully discharged state to 50% of its rated capacity) at a rate of 0.33C (i.e. at a current set to 0.33 time the rated capacity of the battery in ampere hours) using the charge/discharge device. After standing for 30 minutes, the battery was discharged at a 3C constant current A, and the voltage change $\Delta V$ during the discharge process was recorded. Then, DCR1000=$\Delta V$/A. DCR growth rate=(DCR1000/DCR)−1.

TABLE 1

Test results of the Examples and Comparative Examples

| | Chemical formula | $C_{Co1}$-$C_{Co}$ % | $C_{A1}$-$C_{A11}$ % | 10% SOC DCR (mΩ) | Capacity retention rate after 1,000 cycles % | DCR growth rate after 1,000 cycles % |
|---|---|---|---|---|---|---|
| Ex.1 | $Li_{0.99}(Ni_{0.65}Co_{0.08}M_{0.27})_{0.998}Zr_{0.001}Al_{0.001}O_2$ | 9.52 | 10.0 | 15.3 | 96.2 | 7.3 |
| Ex.2 | $Li_{1.01}(Ni_{0.65}Co_{0.07}M_{0.28})_{0.9975}Zr_{0.001}Al_{0.0015}O_2$ | 2.72 | 16.3 | 17.3 | 97.0 | 7.5 |
| Ex.3 | $Li_{1.03}(Ni_{0.63}Co_{0.08}M_{0.29})_{0.9978}Zr_{0.001}Al_{0.0012}O_2$ | 10.52 | 7.5 | 13.1 | 95.5 | 8.9 |
| Ex.4 | $Li_{1.03}(Ni_{0.60}Co_{0.09}M_{0.31})_{0.9979}Zr_{0.001}Al_{0.0011}O_2$ | 5.42 | 19.3 | 14.5 | 97.3 | 6.8 |
| Ex.5 | $Li_{1.03}(Ni_{0.60}Co_{0.09}M_{0.31})_{0.998}Zr_{0.001}Al_{0.001}O_2$ | 7.62 | 11.3 | 11.7 | 96.4 | 7.3 |
| Ex.6 | $Li_{1.03}(Ni_{0.60}Co_{0.09}M_{0.31})_{0.998}Zr_{0.001}Al_{0.001}O_2$ | 8.42 | 5.3 | 10.2 | 95.1 | 7.7 |
| Ex.7 | $Li_{0.99}(Ni_{0.65}Co_{0.08}M_{0.27})_{0.999}Al_{0.001}O_2$ | 10.01 | 10.2 | 14.2 | 93.5 | 8.9 |
| Ex.8 | $Li_{1.02}(Ni_{0.76}Co_{0.06}Al_{0.18})_{0.999}Zr_{0.001}O_2$ | 3.21 | 10.3 | 13.7 | 92.9 | 6.9 |
| Comp. Ex.1 | $Li_{1.01}(Ni_{0.65}Co_{0.07}M_{0.28})_{0.999}Zr_{0.001}O_2$ | 2.51 | 0.0 | 14.9 | 87.3 | 18.2 |
| Comp. Ex.2 | $Li_{1.01}(Ni_{0.66}Co_{0.06}M_{0.28})_{0.9975}Zr_{0.001}Al_{0.0015}O_2$ | 0.31 | 19.1 | 21.3 | 95.2 | 15.4 |
| Comp. Ex.3 | $Li_{1.01}(Ni_{0.66}Co_{0.06}M_{0.28})_{0.999}Zr_{0.001}O_2$ | 1.11 | 0.0 | 19.4 | 85.7 | 31.1 |
| Comp. Ex.4 | $Li_{1.01}(Ni_{0.65}Co_{0.07}M_{0.28})_{0.9975}Zr_{0.001}Al_{0.0015}O_2$ | 3.12 | 1.1 | 16.2 | 89.9 | 16.9 |
| Comp. Ex.5 | $Li_{1.01}(Ni_{0.65}Co_{0.07}M_{0.28})_{0.9975}Zr_{0.001}Al_{0.0015}O_2$ | 1.32 | 7.6 | 16.7 | 93.7 | 13.6 |

The technical features of the materials described in Examples 1 to 8 all reside within the preferred ranges described in the present disclosure, and the batteries made using the corresponding materials have a lower initial direct current internal resistance (DCR), a better cyclic capacity retention rate and a better cyclic direct current internal resistance (DCR) growth rate. $C_{Co1}$–$C_{Co}$ is the difference between the percentage of Co atoms near the surface of the material and the average Co atom content in the material. When the difference is ≥2%, it means that there is more Co near the surface of the material, which enables promotion of both electron conduction and ion transfer of the material. $C_{Al}$–$C_{All}$ is the difference between the percentage of Al atoms on the surface of the material and the percentage of Al atoms near the surface. When the difference is ≥5%, it means that the surface of the material has an Al coating, and Al atoms have not penetrated into the material. As it can be seen from a comparison of the data of Example 1 and Comparative Example 1, when the surface of the material is not coated with Al, $C_{Al}$–$C_{All}$<5%, which is outside the preferred range, and the cyclic capacity retention rate of the material is apparently reduced. As it can be seen from a comparison of the data of Example 1 and Comparative Example 2, when the surface of the material is not coated with Co, $C_{Co1}$–$C_{Co}$<2%, which is outside the preferred range. Although the capacity retention rate of the material can be maintained at a high level, the direct current impedance is high. As it can be seen from a comparison of the data of Example 1 and Comparative Example 3, when the surface of the material has neither of these two coatings, $C_{Al}$–$C_{All}$ and $C_{Co1}$–$C_{Co}$ are both outside the preferred ranges, and the direct current impedance, cyclic capacity retention rate and cyclic direct current internal resistance (DCR) growth rate of the material are all poor. As it can be seen from a comparison of the data of Example 1 and Comparative Example 4, when the coating process is carried out with a coating agent of smaller particles, the Al element will penetrate into the region near the surface and the inside of the material, such that $C_{Al}$–$C_{All}$<5%. In such a case, the coating cannot function to protect the material in a long-term cycling process on the one hand, and on the other hand, it also hinders migration of electrons and ions, and thus increases the direct current internal resistance of the material. As it can be seen from a comparison of the data of Example 1 and Comparative Example 5, when the secondary sintering temperature selected is not high enough, such that the Co element fails to enter the region near the surface of the material, and $C_{Co1}$–$C_{Co}$<2% will also be resulted. In such a case, although the direct current impedance and cyclic capacity retention rate of the material are still good, it cannot be guaranteed that the direct current impedance of the battery will be maintained at a low level during a long-term cycling process.

Specific embodiments according to the present disclosure have been described above. It should be appreciated that the present disclosure is not limited to the above specific embodiments. Those skilled in the art can make various changes or modifications within the scope defined by the claims, and the substantive matter of the present disclosure is not affected. Where there is no conflict, the Examples and the features in the Examples in the present disclosure can be combined with each other freely.

What is claimed is:

1. A ternary positive electrode material, wherein the ternary positive electrode material has a chemical composition of $Li_a(Ni_xCo_yM_{1-x-y})_{1-b}M'_bO_{2-c}A_c$, wherein 0.75≤a≤1.2, 0.5≤x<1, 0<y≤0.1, 0<b≤0.01, 0≤c≤0.2; M is at least one selected from the group consisting of Mn and Al; M' includes Al and optionally one or more selected from the group consisting of Zr, Ti, Y, Sr, W and Mg; and A is one or more selected from the group consisting of S, F and N;

wherein 2%≤$C_{Co1}$–$C_{Co}$, wherein $C_{Co1}$ is an atomic percentage of Co element with respect to all metal elements except Li element measured by XPS after etching of the positive electrode material, and $C_{Co}$ is an atomic percentage of Co element with respect to all metal elements except Li element obtained by analyzing the positive electrode material with ICP;

5%≤$C_{Al}$–$C_{All}$, wherein $C_{Al}$ is an atomic percentage of Al element with respect to all metal elements except Li element obtained by analyzing the positive electrode material directly with XPS, and $C_{All}$ is an atomic percentage of Al element with respect to all metal elements except Li element measured by XPS after etching of the positive electrode material.

2. The ternary positive electrode material according to claim 1, wherein $C_{Co1}$ is an atomic percentage of Co element with respect to all metal elements except Li element measured by XPS at a depth of 20-60 nm from a surface of the positive electrode material after etching of the positive electrode material; $C_{All}$ is an atomic percentage of Al element with respect to all metal elements except Li element measured by XPS at a depth of 20-60 nm from a surface of the positive electrode material after etching of the positive electrode material.

3. The ternary positive electrode material according to claim 1, wherein 5.3%≤$C_{Al}$–$C_{All}$.

4. The ternary positive electrode material according to claim 1, wherein 10%≤$C_{Al}$–$C_{All}$.

5. The ternary positive electrode material according to claim 1, wherein 2.7%≤$C_{Co1}$–$C_{Co}$.

6. The ternary positive electrode material according to claim 1, wherein 5%≤$C_{Co1}$–$C_{Co}$.

7. The ternary positive electrode material according to claim 1, wherein conditions for the etching are: $Ar^+$ ion etching, 2,500 eV≤E≤3,500 eV, 90 s≤t≤100 s, wherein E is energy used for the etching, and t is etching time.

8. The ternary positive electrode material according to claim 1, wherein in the chemical composition $Li_a(Ni_xCo_yM_{1-x-y})_{1-b}M'_bO_{2-c}A_c$ of the ternary positive electrode material, M' includes Al and one or more selected from the group consisting of Zr, Ti, Y, Sr, W and Mg.

9. The ternary positive electrode material according to claim 1, wherein in the chemical composition $Li_a(Ni_xCo_yM_{1-x-y})_{1-b}M'_bO_{2-c}A_c$ of the ternary positive electrode material, M' includes Al and Zr.

10. The ternary positive electrode material according to claim 1, wherein in the chemical composition $Li_a(Ni_xCo_yM_{1-x-y})_{1-b}M'_bO_{2-c}A_c$ of the ternary positive electrode material, c=0.

11. The ternary positive electrode material according to claim 1, wherein a particle size $D_{v50}$ corresponding to a cumulative particle volume distribution at 50% for the ternary positive electrode material satisfies 2 μm≤$D_{v50}$≤5 μm.

12. A positive electrode sheet comprising the ternary positive electrode material of claim 1.

13. A lithium ion battery comprising the positive electrode sheet of claim 12.

14. A method for preparing the ternary positive electrode material of claim 1, comprising the following steps:

Step S1: mixing a ternary positive electrode precursor containing Ni, Co, Mn or Ni, Co, Al with a lithium source fully to form a mixture I;

Step S2: heating the mixture I in an air or oxygen atmosphere, wherein the mixture I needs to be held at 700-1,100° C. for 4-15 hours, followed by rolling and pulverization to obtain an intermediate product II;

Step S3: mixing the intermediate product II with an Al-containing solid powder and a Co-containing solid powder fully to form a mixture III;

Step S4: heating the mixture Ill in an air or oxygen atmosphere, wherein the mixture Ill needs to be held at 700-1,000° C. for 4-15 hours, followed by rolling and pulverization to obtain a ternary positive electrode material having an $\alpha$-NaFeO$_2$ structure;

wherein if M' element in the ternary positive electrode material includes one or more elements selected from the group consisting of Zr, Ti, Y, Sr, W and Mg, a compound comprising the one or more elements selected from the group consisting of Zr, Ti, Y, Sr, W and Mg is added in a process of forming the mixture I and/or a process of forming the mixture III;

wherein if the ternary positive electrode material comprises A element, a compound containing the A element is added in a process of forming the mixture I and/or a process of forming the mixture III.

15. The method for preparing the ternary positive electrode material according to claim 14, wherein in Step S1, the lithium source is one or more selected from the group consisting of lithium carbonate and lithium hydroxide.

16. The method for preparing the ternary positive electrode material according to claim 14, wherein in Step S1, the M' element in the ternary positive electrode material comprises Zr element, and a Zr-containing compound is added in the process of forming the mixture I.

17. The method for preparing the ternary positive electrode material according to claim 14, wherein in Step S3, the Al-containing solid powder is an alumina powder having a particle size in the range of 100 nm$\leq$D$_{alumina}$$\leq$1,000 nm.

18. The method for preparing the ternary positive electrode material according to claim 14, wherein in Step S3, the Co-containing solid powder is any one or more selected from the group consisting of Co$_3$O$_4$, CoO, Co(OH)$_2$, CoOOH and CoCO$_3$.

19. The method for preparing the ternary positive electrode material according to claim 14, wherein in Step S3, a molar ratio of Co element in the Co-containing solid powder to the intermediate product II is (1-3): 100; and/or a mass ratio of Al element in the Al-containing solid powder to the intermediate product II is (0.02-1.5): 100.

* * * * *